March 18, 1969  W. A. STEWART  3,432,974
METHOD OF MAKING AN IMPROVED VACUUM BELT
Filed Sept. 15, 1966

INVENTOR.
WARREN A. STEWART
BY Boyce C. Dent
his Attorney

United States Patent Office 3,432,974
Patented Mar. 18, 1969

3,432,974
METHOD OF MAKING AN IMPROVED
VACUUM BELT
Warren A. Stewart, Monkton, Md., assignor to Koppers Company, Inc., a corporation of Delaware
Filed Sept. 15, 1966, Ser. No. 579,746
U.S. Cl. 51—328   2 Claims
Int. Cl. B24b 1/00, 7/00, 9/00

ABSTRACT OF THE DISCLOSURE

A method of grinding the outer face of a resilient endless belt having a toothed inner periphery with an inner circumferential groove therein to provide a flat outer face on the belt which comprises moving the outer face of the belt past a grinding wheel while supporting the belt and the inner groove on the side opposite the grinding wheel so that the grinding wheel removes an outer layer from the belt.

---

This invention relates generally to a method of grinding an endless vacuum belt used in a device for applying a pulling force to a corrugated web to advance the web through a glue curing operation in the making of corrugated paperboard.

The toothed vacuum belt produced by the process of the present invention is an improvement over the toothed vacuum belts described in my copending application Ser. No. 561,460, filed June 29, 1966. It is important that the outer periphery of the vacuum belt for advancing the continuous web described in the aforementioned application be laterally flat. Otherwise, the web will not lie flat against the belt and atmosphere will be drawn into the outer vacuum grooves. If this occurs, the web will not adhere firmly to the belt and operation of the machine will be impaired. Since lateral grooves are cut in the vacuum belts to provide evacuated spaces between the belt and the web, it is desirable to make the belt of additional thickness of rubber encasing the reinforcing wires in the belt to permit the cutting of grooves in the belt.

The manufacture of conventional toothed belts is shown and described in Case Patent No. 2,507,852. To make such belts thicker for the purpose of this invention, another layer of synthetic rubber or like material is fused to the outer surface of the belt during original manufacture. Controlling the lateral flatness of the additional layer of rubber to the desired degree during manufacture of the belt is difficult. Consequently after its manufacture, the belt is ground to provide a flat surface. As more fully described in my copending application, the belt has a circumferential laterally centered groove in the inner periphery extending to the depth of the teeth. This groove is readily formed during original manufacture so that subsequent grinding is not required to form it in the belt. But, because of this groove, grinding of the outer periphery to provide a flat surface will not produce a satisfactory result when done in the ordinary manner. Since the grinding wheel or belt must press downward rather hard against the belt, the area of the belt opposite the inner circumferential groove is depressed rather than ground off. Consequently, when the grinding wheel is removed, the depressed area springs upward and results in an outer circumferential bulge. This bulge is not readily noticeable with the belt in the free state. However, it becomes immediately apparent when the belt is put in use since the web will not lie flat against it and atmosphere leaks between the web and the belt.

Accordingly, an object of this invention is to provide a method of grinding a vacuum belt of extra thickness having a network of outer lateral grooves in communication with a laterally centered inner circumferential groove to provide a flat outer lateral surface for engagement with an advancing web.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figures 1, 2:
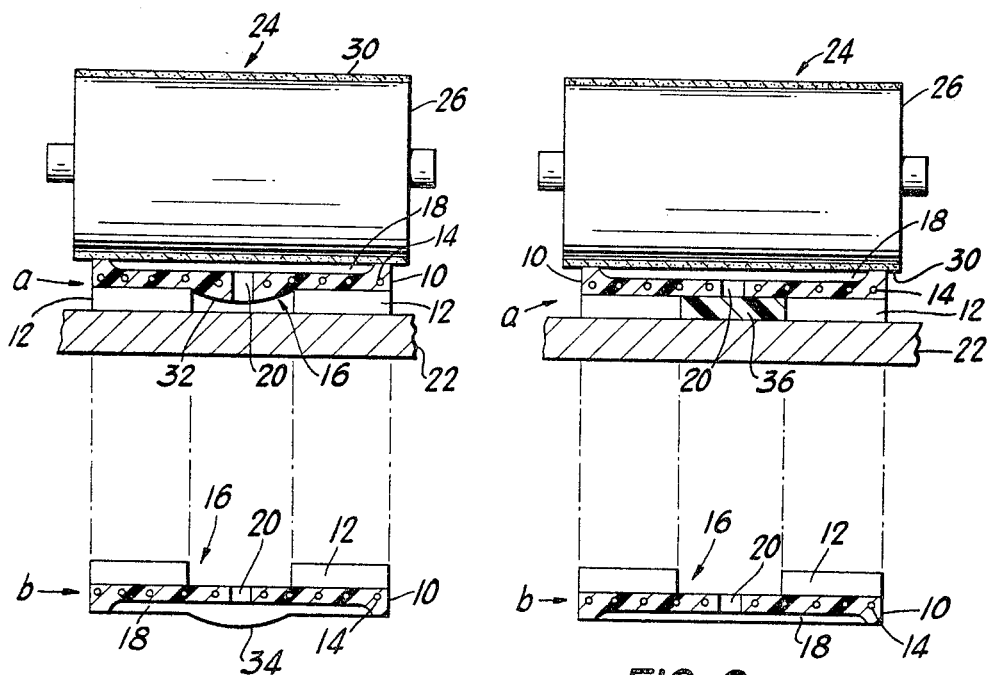
FIGURE 1 is a section through the width of the vacuum belt showing in exaggerated proportions, in the upper run, the depression formed during conventional grinding and, in the lower run, the bulge resulting from such grinding.
FIGURE 2 is a similar section showing the preferred method of grinding the belt to prevent formation of a depression and resultant bulge.

Referring now to FIGURE 1, there is illustrated the upper run $a$ and the lower run $b$ of an endless vacuum belt 10. Laterally extending teeth 12 are spaced evenly around the inner periphery of belt 10, and the belt is reinforced by a plurality of circumferential wires 14 embedded in the synthetic rubber of which the belt is made. Formed in the inner periphery of the belt during the molding process by which the belt is initially made is a circumferential groove 16 whose width is substantially less than the width of the belt 10 and whose depth extends to the bottom of teeth 12. Belt 10 also has a network of grooves 18 extending laterally across the outer peripheral face of the belt. These grooves 18 are substantially evenly spaced around the outer periphery of the belt. These grooves 18 may be molded in the belt but, contrary to the belt illustrated herein, are preferably formed by cutting the belt after the surface grinding operation hereinafter described has been completed. Groove 16 is placed in communication with each lateral groove 18 by an aperture 20.

As previously mentioned, the additional thickness of the outer face of belt 10 is to prevent severance of the reinforcing wires 14 when grooves 18 are cut in the outer face. The extra thickness is made by adding an extra layer of rubber to the outer face during the molding process. Because the belt is used for advancing a corrugated web through a double-facer machine, it is subjected to high temperatures of the order of 200° F. as a result of the heat applied to the web during the adhesive curing process in the double facer for making corrugated paperboard. To make the belt more compatible, the extra rubber added is of a heat resistant type such as "Hypolon," a trademarked brand made by the United States Rubber Company of New York City. Similar types of heat resistant rubber are suitable and are applied to the outer face by fusing during the molding process.

Surface grinding of the belt 10 to provide a flat outer face is conventionally accomplished by supporting the upper run of the belt on a support, the flat portion 22 of which support is shown. A grinding unit generally designated by numeral 24 is placed opposite the flat portion 22 and operated to make the upper surface into a truly flat plane. Grinding unit 24 may be a single abrasive wheel with suitable drive means (not shown) or a pair of drums 26 and 28 surrounded by an abrasive belt 30 also having suitable drive means as well understood in the art. A portion of belt 30 is pressed against belt 10 with sufficient pressure to compress the rubber slightly against support 22.

Grinding of the outer face of belt 10 may be accomplished as follows. The belt 10 is clamped to support 22 (by clamps not shown) so that the belt cannot move. Then the grinding unit 24 is pulled horizontally along the length of belt 10, at the same time driving abrasive belt 30 around drums 26 and 28. Belt 10 may then be moved to a new position so that an unground face portion lies opposite support 22 and the grinding operation continued and until the belt 10 is completely ground.

However, since it is necessary to force the abrasive belt 30 against belt 10 to grind it, such force causes the portion of belt 10 opposite groove 16 to be depressed into the groove 16. This is illustrated in exaggerated proportions by numeral 32 on the upper run of belt 10 in FIGURE 1. Because of this movement of the belt layer into groove 16, a smaller amount of rubber is removed from the outer portion of the belt that is opposite inner groove 16 than from the sides which are supported by teeth 12. Consequently when the grinding pressure is removed, the portion of the belt which bridges over the groove 16 assumes its original shape; and the rubber, which should have been but was not removed, forms a bulge 34 as illustrated in exaggerated proportions on the lower run of belt 10 in FIGURE 1. In practice, it has been found that when a belt 14 inches wide and about ⅜ inch thick with an inner groove 16 of 2½ inches in width is ground to a thickness of 9/32 inch, a bulge is formed about 0.050 inch high on the outer face of the belt. Because the bulge is arcuate, it is not readily noticeable. But when such belt is placed in operation, the corrugated web that is being advanced will not lie flat on the belt and atmosphere leaks between the web and the outer face of the belt into grooves 18. With this leakage, the web will not adhere well to the belt and the machine is rendered inefficient. It is believed that a bulge as little as 0.010 in height will reduce the efficiency of the belt.

In accordance with this invention, an auxiliary support 36 is secured to the top of support 22, FIGURE 2, in line with groove 16. The thickness of auxiliary support 36 is the same as the depth of groove 16 so that the belt is flatly supported across its width. Auxiliary support 36 is substantially the same width as groove 16, being slightly narrower to provide a running clearance between the support and teeth 12. Support 36 may be secured to support 22 in any suitable manner, for example, by an adhesive or by flat headed screws (not shown) or the like. Support 36 is preferably of a low friction material such as polytetrafluoroethylene.

Figure 4:
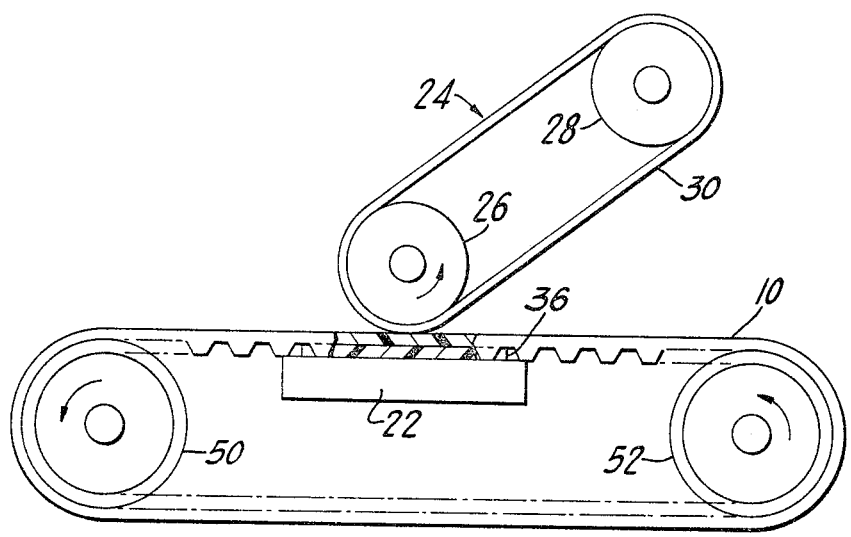
FIGURE 4 is a side elevation in partial cross-section of the apparatus of FIGURE 2 for performing the preferred method of grinding the belt.

As an alternative, belt 10 may surround and be driven by a pair of toothed pulleys 50 and 52 (see FIG. 4) so that the outer face of belt 10 is moved past abrasive belt 30 which is also driven, preferably in the same direction to obtain the greatest speed differential between the outer face of belt 10 and the abrasive of belt 30. In this embodiment, the grinding unit 24 may remain in a stationary position with a desired pressure being applied against the outer face of belt 10.

Figure 3:
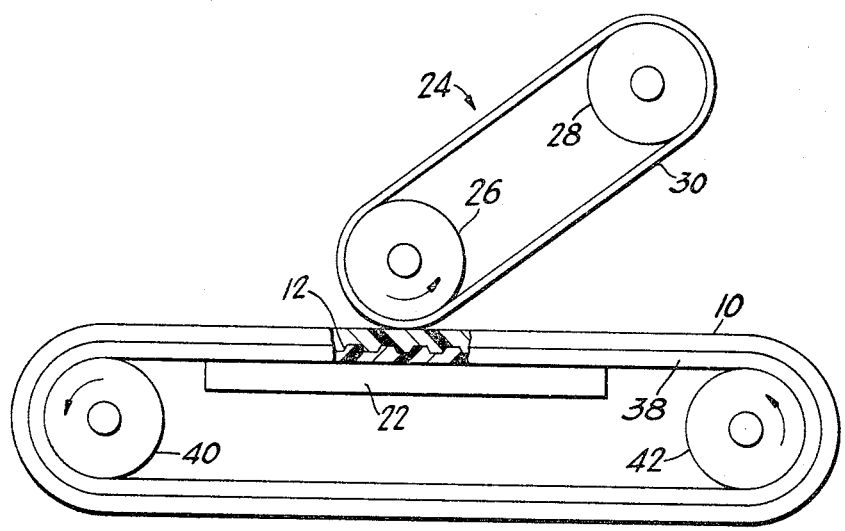
FIGURE 3 is a side elevation in partial cross-section showing an alternate method of grinding the belt.

Still another embodiment of the invention is illustrated in FIGURE 3. A toothed belt 38 is turned inside out so that its teeth are on the outer periphery. This belt encircles a pair of pulleys 40 and 42 of which one is driven to rotate the belt. The pulleys are preferably smooth faced since there are no belt teeth meshing with them. The outer circumferential length of belt 38 is chosen to match the inner circumferential length of the belt 10 to be ground. In the manner illustrated, the outer teeth of belt 38 mesh with the inner teeth of belt 10. The teeth of belt 38 extend laterally across belt 38, and since belt 38 has no circumferential groove dividing its teeth, they support the entire width of the belt 10. Thus, the belts are drawn simultaneously between support 22 and abrasive belt 30. Belt 30 is rotated as before and the outer face of belt 10 is ground flat.

Thus, a method is provided for easily and quickly grinding the outer face of a toothed belt to provide a flat surface for engaging a web to advance it by means of a vacuum applied to a network of grooves in the belt.

Having thus described my invention in its best embodiment and mode of operation, what I desire to claim by Letters Patent is:

1. A method of grinding the outer face of a resilient endless belt having a toothed inner periphery with an inner circumferential groove therein to provide a flat outer face on said belt, comprising the steps of:

moving the outer face of said belt past a grinding means;

supporting said belt and said circumferential groove substantially opposite said grinding means; and pressing said grinding means against said outer face for removing a layer of said outer face.

2. The method of claim 1 wherein supporting said circumferential groove comprises:

rigidly filling said groove opposite said grinding means.

References Cited

UNITED STATES PATENTS

| | | | |
|---|---|---|---|
| 396,553 | 1/1889 | Fowle. | |
| 1,932,092 | 10/1933 | Higo | 51—137 |
| 2,541,080 | 2/1951 | Lyon | 51—74 X |
| 2,934,279 | 4/1960 | Nestor et al. | 51—135 X |

LESTER M. SWINGLE, *Primary Examiner.*

U.S. Cl. X.R.

51—74, 137